United States Patent [19]

Andre

[11] Patent Number: 4,792,029
[45] Date of Patent: Dec. 20, 1988

[54] CLUTCH ARRANGEMENT

[76] Inventor: Axel G. Andre, 19 Brougham Avenue, Croydon, Victoria, Australia

[21] Appl. No.: 808,450
[22] PCT Filed: Apr. 4, 1985
[86] PCT No.: PCT/AU85/00074
§ 371 Date: Dec. 5, 1985
§ 102(e) Date: Dec. 5, 1985
[87] PCT Pub. No.: WO85/04696
PCT Pub. Date: Oct. 24, 1985

[30] Foreign Application Priority Data
Apr. 5, 1984 [AU] Australia ................ PG4424

[51] Int. Cl.⁴ .................. F16D 13/60; F16D 19/00
[52] U.S. Cl. .................. 192/85 AA; 192/70.11; 192/70.13; 192/70.3; 192/94
[58] Field of Search ........... 192/70.11, 70.13, 85 A, 192/85 AA, 85 CA, 70.3, 94

[56] References Cited

U.S. PATENT DOCUMENTS

| | | | |
|---|---|---|---|
| 654,162 | 7/1900 | Kuhn ........................ | 192/66 |
| 1,305,029 | 5/1919 | Tibbetts ..................... | 192/70.13 |
| 2,023,597 | 12/1935 | Klocke et al. ............... | 192/85 AA |
| 2,039,128 | 4/1936 | Tiedemann .................. | 192/85 CA |
| 2,061,093 | 11/1936 | Tatter ........................ | 192/109 R |
| 2,152,733 | 4/1939 | Elliott et al. ................. | 192/66 |
| 2,158,250 | 5/1939 | Peters ........................ | 192/85 CA |
| 2,684,742 | 7/1954 | Eason ........................ | 192/85 AA |
| 2,785,781 | 3/1957 | Johansen .................... | 192/18 A |
| 3,048,248 | 8/1962 | Becknell ..................... | 192/85 CA |
| 3,166,167 | 1/1965 | Kinsman ..................... | 192/18 A |
| 3,199,646 | 8/1965 | McBride ..................... | 192/85 AA |
| 3,237,737 | 3/1966 | Mamo ........................ | 192/70.11 |
| 3,360,088 | 12/1967 | Farr et al. ................... | 192/66 |
| 3,548,989 | 12/1970 | Root .......................... | 192/111 A |
| 3,633,717 | 1/1972 | Stair .......................... | 192/96 |
| 4,049,100 | 9/1977 | Davis ......................... | 192/58 C |
| 4,191,284 | 3/1980 | King .......................... | 192/85 AA |
| 4,193,485 | 3/1980 | Johns et al. ................. | 192/85 CA |
| 4,326,614 | 4/1982 | Matagrand .................. | 192/70.13 |
| 4,561,531 | 12/1985 | Young et al. ................ | 192/85 CA |

FOREIGN PATENT DOCUMENTS

| | | |
|---|---|---|
| 138821 | 9/1947 | Australia . |
| 738516 | 8/1943 | Fed. Rep. of Germany . |
| 2922165 | 12/1980 | Fed. Rep. of Germany . |
| 2517394 | 6/1983 | France . |
| 615507 | 1/1949 | United Kingdom . |
| 752516 | 7/1956 | United Kingdom . |
| 804562 | 11/1958 | United Kingdom ............ 192/70.27 |
| 2099933 | 12/1982 | United Kingdom . |

Primary Examiner—Rodney H. Bonck
Assistant Examiner—David A. Testardi
Attorney, Agent, or Firm—Merchant, Gould, Smith, Edell, Welter & Schmidt

[57] ABSTRACT

A clutch arrangement (10) for coaxial shaft members including a drive or input shaft member (12 or 14) and a driven or output shaft member (14 or 12); the arrangement having a disc (20) concentrically mountable on one of the shaft members for rotation with the one shaft member; a plate member (28) mountable on the other shaft member for rotation therewith and so as to extend at least diametrically of the other shaft member in substantially parallel relation with the disc (20), the plate member (28) having at least two openings (46) therethrough each axially in line with the disc (20); a respective axially extending, force applying arm (48) located in each opening; a frame member (50) interconnecting each of the force applying arms (48); and respective friction pad means (52) on each side of the disc (20), each pad means (52) being operatively mounted such that on application of an axial force to the frame member (50), the axially extended arms (48) are movable to cause each of the pad means (52) to move relative to the disc (20) from one to the other of two relative positions, in a first of which positions the pad means (52) grip the disc (20), and in the second of which positions of the pad means (52) release the disc (20) being rotatable with each of the plate member (28), the arms (48) and the frame member (50) with the pad means (52) in their first position, and being rotatable relative to each of the plate member (28), the arms (48) and the frame member (50) with the pad means (52) in their second position.

21 Claims, 5 Drawing Sheets

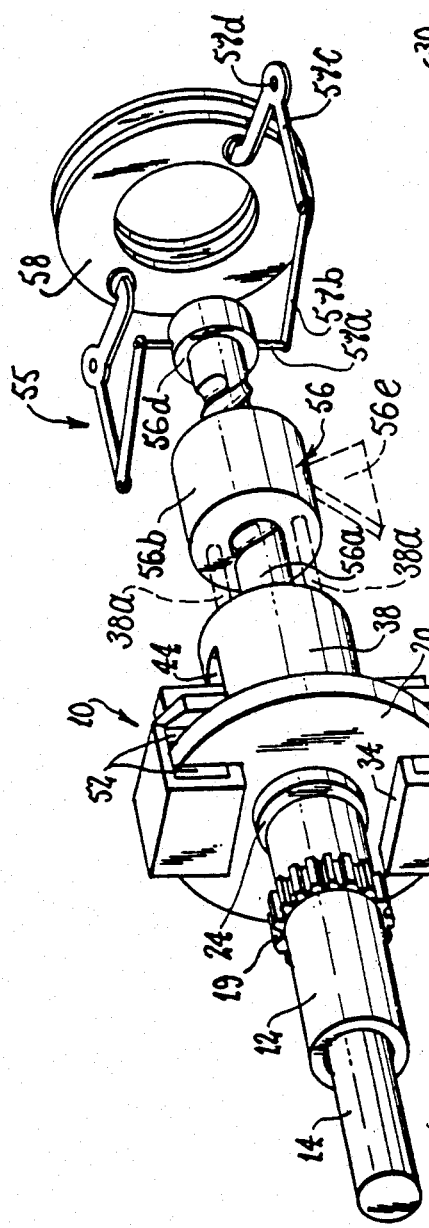
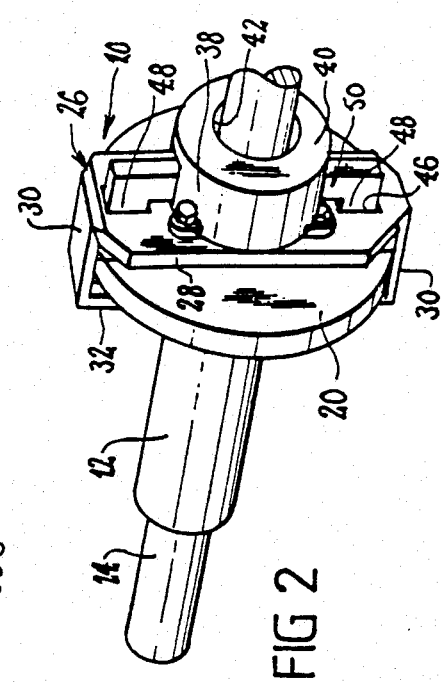

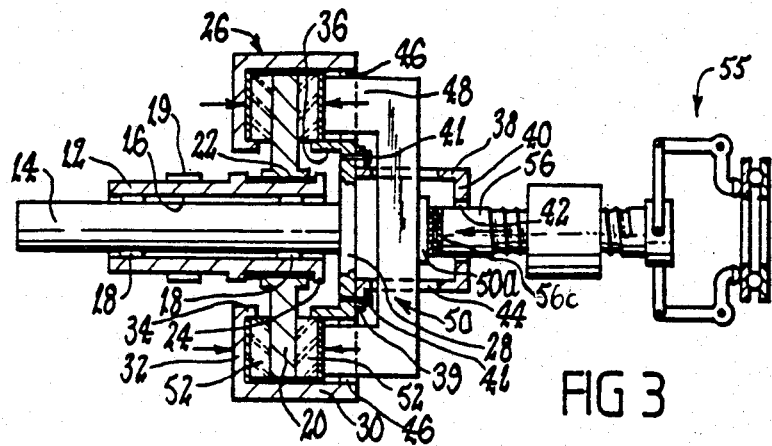
FIG 3
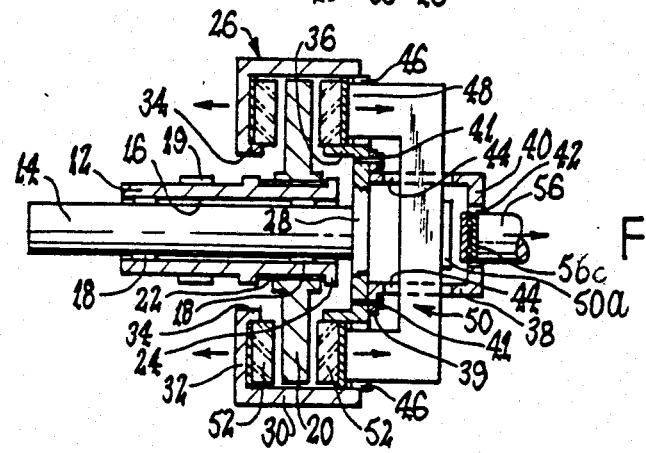
FIG 4
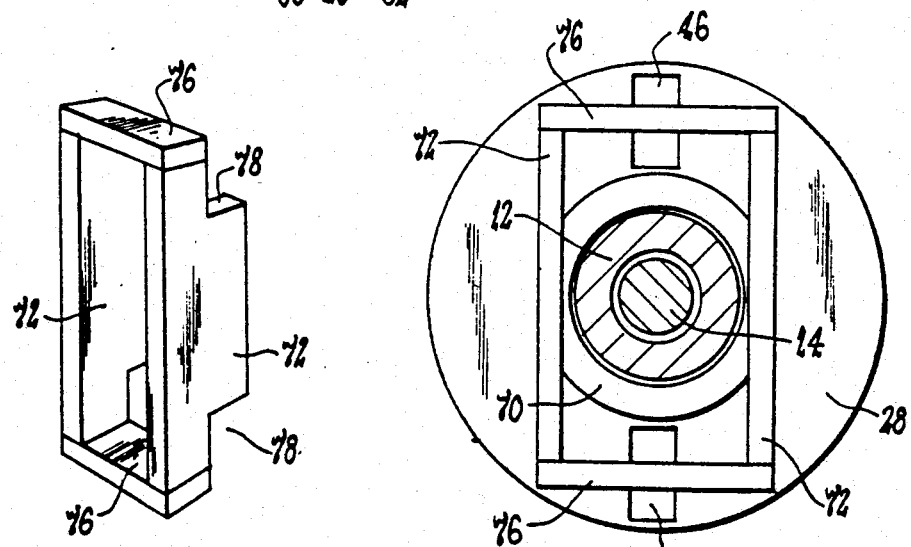
FIG 6
FIG 7

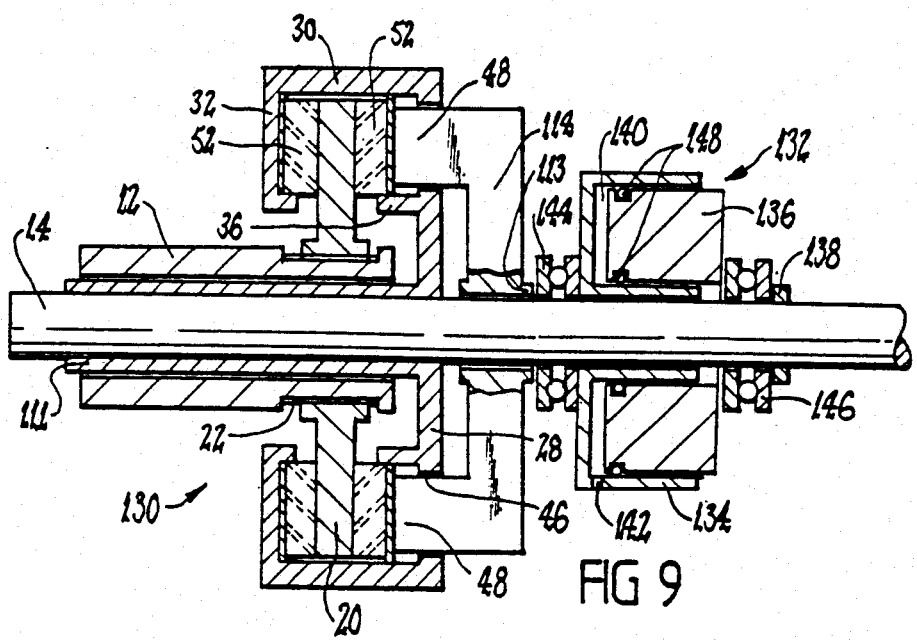
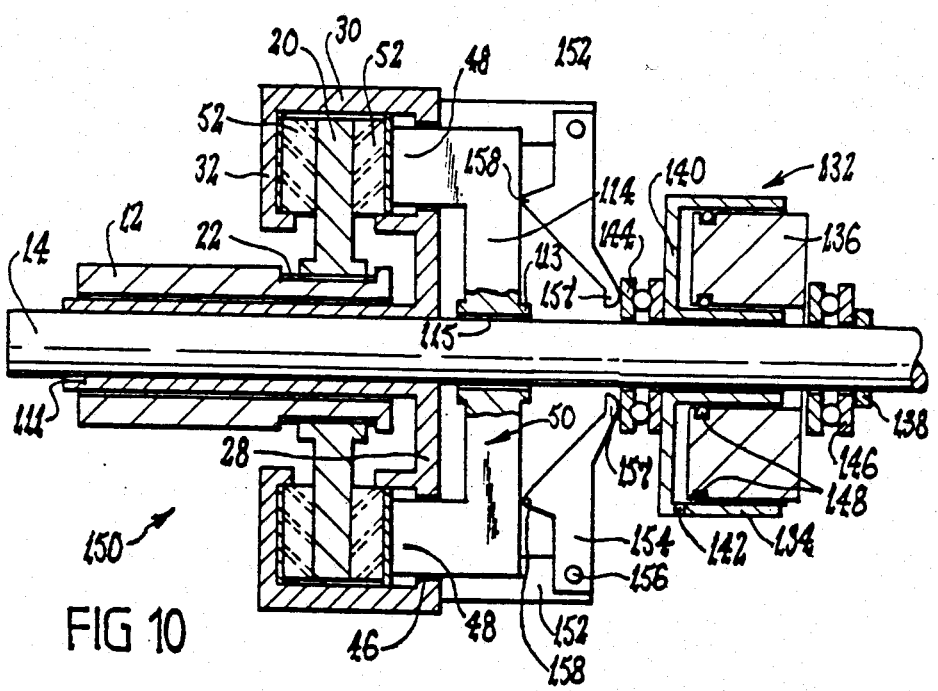

CLUTCH ARRANGEMENT

This invention relates to a clutch arrangement for providing disengageable drive between co-axial shafts.

According to the invention, there is provided a clutch arrangement for co-axial shaft members, one of which is a drive or input shaft member and the other of which is a driven or output shaft member. The arrangement includes an annular disc concentrically mountable on one of the shaft members and rotatable with that one member, and a plate member projecting at least diametrally of the other shaft member in substantially parallel relationship with the disc. The plate member has at least two openings therethrough, in each of which is provided a respective force applying arm extending therethrough parallel to the clutch axis; with each of those arms being inter-connected by a frame member. The clutch arrangement further includes respective friction pad means on each side of the disc; the respective pad means being operatively mounted such that, on application of an axial force to the frame member, the axially extending arms are movable to cause each of the pad means to move relative to the disc from one to the other of respective positions in a first one of which the pad means grip the disc for rotation of the shaft members in unison and in the second of which the pad means release the disc so the drive or input shaft member is rotatable relative to the driven or output shaft member.

The shaft members may be co-axial shafts. Alternatively, one shaft member may be a shaft, with the other member being a sleeve mounted on one end of the shaft and extending beyond that end to enable a second shaft to be coupled to the one shaft in end to end relation. With this alternative in mind, the description hereinafter will refer t the co-axial shaft members simply as shafts, for ease of description.

The clutch arrangement of the invention is such that, with the pad means in their position in which they release the disc, the one shaft and the disc thereon are rotatable relative to the other shaft, the plate member, the axially extending arms and the frame member. However, with the pad means in their position in which they grip the disc, the arrangement is such that both shafts, the disc, the plate member, the axially extending arms and the frame member all are rotatable in unison.

The clutch arrangement of the invention is of simple construction, enabling it to be built in a robust, inexpensive form. Also, it is able to be dismantled readily for servicing such as to replace worn pad means. The clutch arrangement is adaptable to a wide variety of applications and can be installed for a low cost compared with conventional clutches. Also, compared with conventional clutches, such as of the type disclosed in U.S. Pat. No. 3,199,646, they for example are more compact, and have higher torque capabilities, permit higher rotational speeds, and have lower inertia loads.

Thus, one commercially available clutch of the type disclosed by that U.S. specification of 15 inch diameter, and a clutch arrangement according to the invention of 10 inch diameter provide the following comparative data:

| Characteristic | Prior Art | Invention |
| --- | --- | --- |
| Maximum revolutions | 1200 rpm | 2400 rpm |
| Maximum torque (at 80 psi air pressure) | 18,000 lb | 34,000 lb |
| Maximum Horsepower transmitted | 150 | 560 |
| Pad means replacement | Total Dismantling | Slip in new pads |

Also, the clutch according to the invention can be made and installed at less than half the cost for the prior art device; while clutch arrangement of the present invention can be readily provided in a form normally engaged by spring action with actuator release, if required, while the prior art device can not without very extensive modification.

The clutch arrangement of the invention has a wide range of applications. The arrangement is particularly well suite to use as a steering clutch for tracked vehicles, particularly snow-traversing vehicles, because of its high torque capabilities. However, the arrangement can be used in the drive chain for driving left drums and rollers of milling machines, as a drive or safety clutch for conveyor belts, brake presses and guillotines. The clutch arrangement, because of the ease of its engagement and disengagement, is well suited as an alternative to dog clutches; the latter suffering from the disadvantage of being unable to be stopped or disengaged until a full operating cycle has been completed.

The range of applications of the clutch arrangement is increased beyond that for conventional clutches due to its performance characteristics, low cost and ease of maintenance and operation. Additionally, it is well suited to scaling down to diameters of the order of 3 to 5 inches, while the extent to which it can be scaled up is essentially unlimited: the arrangement for example being considered suitable for use with the drive shafts of ocean-going vessels.

The disc may be of annular form and concentrically mounted on the outer shaft, with the frame member mounted on the inner shaft adjacent an end of the outer shaft. In one form, the disc is made integral at its inner circumference with the outer shaft or, by means of an annular housing, integral at its outer circumference with the outer shaft. In an alternative form, the disc is mounted on the outer shaft by means of a spline coupling between its inner circumference and said shaft, or by means of a spline coupling between its outer circumference and a housing integral with the second shaft.

The plate member may have two said openings in diametrally opposed relation, with the arms in said openings being interconnected by a bar member comprising said frame member and extending between said arms. Alternatively, the plate member may have at least three said openings substantially uniformly angularly spaced with respect to said shafts, with the arms in said openings being interconnected by respective radial bar members comprising said frame member and joined centrally with respect to said shafts. In either case, the frame member has a central hub through which said inner shaft extends beyond said outer shaft where the inner shaft is a through shaft.

The plate member, at the side thereof remote from the disc, may have a tubular member extending axially therefrom. Where the frame member comprises such bar member, the frame member preferably extends through opposed radial openings defined by the tubular member, said radial openings enabling movement of the frame member axially with respect to said shafts on application of a said axial force to said frame member. Where the frame member comprises such interconnected radial bar members, each said radial bar member of said frame member preferably extends through a respective radial opening defined by the tubular member, said radial openings again enabling movement of the frame member axially with respect to said shafts on application of a said axial force to said frame member.

The clutch arrangement according to the invention preferably includes an actuator device for applying a said axial force to said frame member. The actuator device may comprise or include a screw device, such as a recirculating ball screw, operable to advance an actuating rod to engage and apply an axial force to said frame member. Alternatively, the actuator device may comprise or include a solenoid having an actuating rod advancable, on energizing said solenoid, to engage and apply an axial force to said frame member. Still further, the actuator device may comprise or include a ram device extendable on supply of pressurized fluid thereto to engage and apply an axial force to said frame member.

Where the clutch arrangement has such tubular member, and an actuator device comprising or including such a solenoid and/or screw device, said actuating rod preferably is guided by said tubular member, with a thrust washer most preferably being provided between said frame member and actuating rod to enable the actuator device to be fixed against rotation.

Where the clutch arrangement has such tubular member, the latter may define a cylinder of an actuator device and have a piston therein movable on supply of pressurized fluid to said device to engage and apply a said axial force to said frame member. Alternatively, the piston may be resiliently biased by spring means to engage and apply a said axial force to said frame member, with the piston being movable on supply of pressurized fluid to said device against said bias to overcome said axial force. In each case, the piston may be of annular form, with the inner shaft a through-shaft extending through said piston.

Particularly where the inner shaft is a through-shaft, a tubular member or an alternative for this is not required. Thus, in the case of an actuator device comprising an annular cylinder and piston actuator, such device may be received on said inner shaft between said frame member and abutment means on said shaft, said actuator device being extendable on supply of pressurized fluid thereto to engage and apply a said axial force to said frame member. Radially extending toggle arms may be provided between said actuator device and said frame member, said toggle arms being pivotable to apply said force to the frame member. A thrust bearing preferably is provided at each end of said actuator device to enable the latter to be fixed against rotation with said inner shaft.

In all forms of the clutch arrangement according to the invention, each of said pad means most preferably comprises at least two friction pads substantially uniformly angularly spaced with respect to said disc. A respective such friction pad of each pad means is axially aligned with each of said axial arms.

The disc most preferably is mounted on the outer one of the concentric shafts, this typically being the drive or input shaft, with the plate member mounted on the inner shaft, adjacent one end of the outer shaft. This arrangement generally will be assumed in the following. However, it is to be appreciated that the inner shaft may be the drive or input shaft. Also, it is to be appreciated that the disc can be provided on the inner shaft, adjacent one end of the outer shaft, with the plate member provided on the outer shaft.

In one form, the clutch arrangement is normally disengaged. In that form, the application of an axial force to the frame member results in movement of that member and the axially extending arms to cause the disc to be gripped between the respective pad means; with release of that force releasing the grip of the pad means on the disc. However, in an alternative form the clutch arrangement may be normally engaged, such as under the bias of spring means acting on the frame member and the axially extending arms to urge the respective pad means to grip the disc therebetween. In that alternative, the application of an axial force to the frame member results in the latter and the axially extending arms being moved to enable the pad means to release their grip on the disc.

In one embodiment, the plate member has a pair of diametrally opposed openings. In that embodiment, the respective axially extending arms preferably are interconnected, such as integrally, by means of the frame member comprising a bar member extending between those arms at their ends remote from the pad means. Where the inner shaft is a through-shaft, the bar may have a centrally disposed hub through which that shaft extends.

Each pad means preferably comprises at least two friction pad members. In such case, each pad member of one pad means may be mounted adjacent that end of a respective axially extending arm which is nearer the disc, axially in line with a respective pad member of the other pad means. The pad members of the other pad means may be mounted on a support which is fixed in relation to the frame member, with the disc being axially movable as the pad members of the one pad means move to effect gripping of the disc between the respective pad means.

Alternatively, the pad members of the other pad means may be mounted on a support which is axially movable, such that both pad means are movable to effect gripping of the disc therebetween. In that alternative, the movable support may be connected to toggle arms by which an axial force is applied to the frame. Such toggle arms may be operatively connected to the support means so as to draw the latter toward one side of the disc simultaneously with application of the force to the frame member to force the latter toward the other side of the disc.

The clutch arrangement may include, as a sub-structure thereof, actuating means for applying an axial force to the frame member. The actuating means may be mechanical, electrical, pneumatic or hydraulic. The actuating means is to act axially of the concentric shafts and may comprise a simple screw device, a recirculating ball screw, a solenoid, or a pneumatic or hydraulic ram device.

The plate member may have, mounted n the side thereof remote from the disc, a guide member through which the frame member extends to each axially extending arm. Such guide member may define a respective, axially extending guide slot for each of two or more portions of the frame member. In one form, the guide member is of tubular form and, for some forms of the actuating device, the latter may be mounted on or in such tubular guide member. Thus, in a section of such tubular guide member, located axially beyond the plate member, the bore of that section may define a cylinder of a hydraulic or pneumatic actuator having a piston therein, with the piston being adapted to receive pressurized fluid from a source thereof for moving the piston. The actuator may include a spring biasing the piston to a position in which it engages the frame member to provide a normally engaged clutch arrangement, with the piston being movable by such fluid against the spring for release of the clutch arrangement. Alternatively, the clutch arrangement may be normally disengaged, with such fluid moving the piston to engage the frame member for engagement of the clutch arrangement.

Such pneumatic or hydraulic actuating device can be adapted for use regardless of whether or not the inner shaft is a through shaft. Where the inner shaft is a through shaft, the actuating device may be of annular form; the device, for example, having a cylindrical piston located co-axially between that shaft and the tubular guide member.

Where the inner shaft is a through shaft, a pneumatic or hydraulic actuating device can be used without the need for the frame member to have a guide member. In such case, such actuating device having both an annular cylinder and an annular piston therein can be mounted co-axially on the inner shaft, between the frame member and a retaining collar on the shaft. Respective thrust bearings between the device and each of the frame member and the collar preferably are provided to enable the shaft to rotate relative to the actuating device. In such arrangement, the device preferably is axially extendable on supply of pressurized fluid thereto to apply an axial force to the frame member; the collar acting to cause resultant extension of the device to be toward the frame member and the disc.

In order that the invention may more readily be understood, description now is directed to the accompanying drawings in which:

FIGS. 1 and 2 are respective perspective views showing a first embodiment of a clutch according to the invention, FIG. 1 including an actuator device;

FIG. 3 is an axial sectional view of the clutch and actuator of FIG. 1, showing the clutch in its engaged condition;

FIG. 4 is an axial sectional view of the clutch of FIG. 2 in its disengaged condition;

FIG. 6 is a perspective view of a component of the clutch of FIG. 5;

FIG. 7 is a transverse sectional view taken on line VII—VII of FIG. 5;

FIG. 9 shows a fourth embodiment in an axial sectional view;

FIG. 10 shows a clutch in axial sectional view according to a fifth embodiment;

Figure 5:
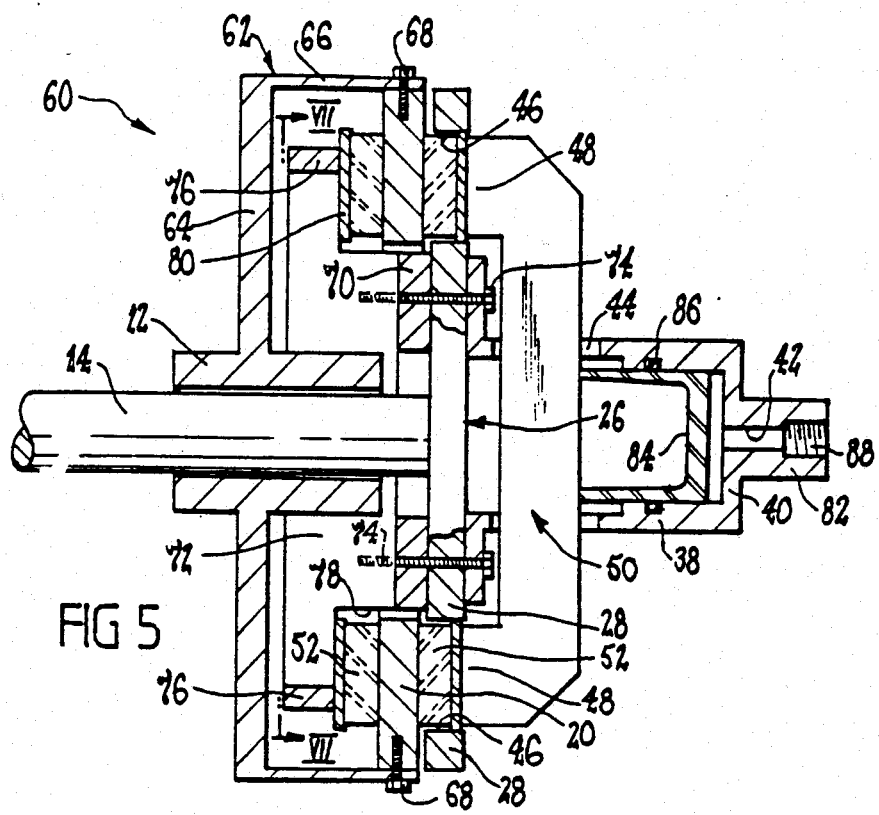
FIG. 5 is an axial sectional view of a clutch according to a second embodiment.

With reference to FIGS. 1 to 4, the clutch 10 comprises first and second shafts 12,14. Either of shafts 12,14 may be the drive shaft, with the other being the driven shaft. However, for ease of description, shaft 12 will be taken as the drive or input shaft, with shaft 14 taken as the driven or output shaft.

Drive shaft 12 is cylindrical and has driven shaft 14 extending co-axially through bore 16 thereof. Bearings 18 can be provided in bore 16 to facilitate relative rotation between shafts 12,14 when drive shaft 12 is rotated and driven shaft 14 is disengaged therefrom.

Drive shaft 12 is rotatable, such as by a drive gear or sprocket chain engaging gear teeth or chain sprocket 19 provided around the external surface thereof. An annular disc 20 is mounted on drive shaft 12 so as to be rotatable therewith. In the arrangement illustrated, there is a spline coupling 22 between disc 20 and shaft 12 by which disc 20 and shaft 12 are rotatable in unison; coupling 22 enabling disc 20 to move axially of shaft 12 between flanges 24 integral with shaft 12. However, in a variant of that arrangement, disc 20 may simply be made integral with shaft 12 for such rotation, and thus not able to move axially thereof.

Driven shaft 14 has a housing 26 mounted thereon which is secured to shaft 14 and which encloses a portion of the periphery of disc 20. Housing 26 includes an end plate 28 extending diametrally of an end of shaft 14 and an adjacent end of shaft 12 and disc 20. Plate 28 may be integral with the end of shaft 14 or welded thereto. Alternatively, plate 28 may have an axial sleeve in which the end of shaft 14 is received and secured by a splined coupling therebetween, or a taper lock or securement bolts. At each end of plate 28, housing 26 has an axially extending arm 30 and further includes respective arms or backing means 32 extending radially inwardly from each arm 30 from the end of the latter remote from plate 28. As shown, each of diametrally opposed peripheral portions of disc 20 are located intermediate plate 28 and a respective arm 32, with each arm 30 extending across the periphery of disc 20 in radially spaced relation thereto.

The radially inner edge of each plate 32 has an axially inturned flange 34 extending towards disc 20. Also, plate 28 has axially projecting flanges 36, each substantially radially aligned with a respective flange 34 and extending towards disc 20.

Projecting axially or plate 28, from the face thereof remote from shaft 12, there is a co-axial guide tube 38 connected to plate 28 by bolts 41 passing through flange 39 of tube 38 into plate 28. The end of tube 38 remote from plate 28 has a radially inturned annular flange 40 which defines a guide bore 42; the other end of tube 38 being made integral with plate 28. Intermediate its ends, tube 38 has diametrally opposed openings 44, in the form of axially extending slots, formed therethrough. Also, radially in line with openings 44, plate 28 has a respective opening 46, in the form of a radially extending slot, intermediate each plate 30 and the adjacent flange 36.

In each opening 46 of plate 28, there is provided an axially extending actuating arm 48. Each of arms 48 is integral with a pressure bar 50 which extends therebetween, diametrally through openings 44 of tube 38. The axial width of bar 50 is less than the axial length of openings 44, such that lateral movement of bar 50 along openings 44 enables the extent to which arms 48 project through plate 28 to be varied.

Within housing 26, there is provided diametrally opposed pairs of friction pads 52. Disc 20 is located intermediate the pads of each pair. A first pad of each pair is secured against the inner face of a respective plate 32 of housing 26; while the other pad is secured against a radial end face of a respective arm 48. In each case, such securement can be by any suitable means, such as by bolts 54 as shown in FIGS. 1 and 2. Alternatively, those pads can be simply located in suitably shaped recesses configured to receive the pad backing plate.

Axially beyond clutch 10, and forming part thereof, there is an actuator device 55. This device includes a recirculating ball screw 56 having its threaded shaft 56a extending axially through bore 42; shaft 56a being movable by rotation relative to housing 52b to engage or be withdrawn from bar 5. Bar 50 optionally carries a contact pad 50a by which it is engaged by 56a; pad 50a preferably being of friction material.

Actuator device 55 may be rotatable with shaft 14 on engagement of clutch 10, such as by tube 38 having extension arms (38a) secured to housing 56b of screw 56. In such case, shaft 56a preferably is able to engage pad 50a directly. However, device 55 alternatively can be fixed against such rotation with shaft 14, such as by housing 56b being mounted on a fixed support or bracket and, in that case, shaft 56a preferably carries a bearing 56c by which it engages pad 50a.

Actuator device 55 also includes a sub-unit 57. The latter includes radial arms 57a extending oppositely from collar 56d fixed on the end of shaft 56a remote from arm 50. At its outer end, each arm 57a is pivotally connected to one end of a respective link 57b extending so as to be pivotable in a plane substantially perpendicular to arm 57a and parallel to shaft 56a. The other end of each link 57b is connected to one end of a bell-crank lever 57c, pivotable at 57d about an axis parallel to arms 57a. The other end of each lever 57c is engaged by a bearing 58, with the pivots at 57d being fixed relative to housing 56b (by means not shown).

The overall arrangement of actuator device 55 is such that a force applied to bearing 58, axially of shafts 12,14 and 56a causes rotation of shaft 56a relative to its housing 56b, by operation of link 57b and level 57c on arms 57a. Shaft 56a thus is able to be rotated to advance or retract with respect to arm 50. The force to be applied to bearing 58 can be by mechanical linkages, such as a fork having fingers engaging the face of bearing 58 remote from levers 57c. Such linkages may be operable by any suitable means, such as an actuator as detailed above for applying an axial force direct to bar 50. Alternatively, such actuator may be operable to engage bearing 58 directly, rather than through linkages; it being possible, for example, to have a solenoid, ram or screw device acting on that face of bearing 58. As will be appreciated, the force to be applied to bearing 58 can be of a relatively low level compared with the axial force applied as a result to bar 50, due to the force multiplying effect of the connection between bearing 58 and shaft 56a. Thus, the force applied to bearing 58 can adequately be provided by a solenoid, or other actuator of relatively low force output.

The overall arrangement is such that operation of the actuating device 55 to move shaft 56a to forcefully engage pad 59, applies pressure centrally to bar 50. As a consequence, arms 48 are moved axially with bar 50, with resultant closing of pads 52 of each pair thereof to grip disc 20 therebetween. With drive shaft 12 and disc 20 rotated, gripping of disc 20 by pads 52 causes the latter to rotate with that disc. As a consequence arms 48, bar 50 and housing 26 are caused to rotate with resultant rotation of driven shaft 14. On cessation of operation of the actuating means, i.e. reversal of the force applied to bearing 58, shaft 56 is retracted, resulting in shaft 12 and disc 20 being rotatable relative to shaft 14.

In the arrangement of FIGS. 1 to 4, housing 26 may more fully enclose the adjacent face and periphery of disc 20. In such case, there may be three or more pairs of pads 52, preferably uniformly spaced around the circumference. With such variant, bar 50 would be replaced by a frame member having three or more radially extending arms, each extending through a respective opening 44 and each ending in an arm 48 projecting through a respective opening 46 in plate 28. A cruciform frame, in place of bar 50, for use with four pairs of pads 52, is a particularly useful arrangement. Also, in any of such variants, arms 48 may be of non-rectangular section, with openings 46 preferably being similarly varied; while bar 50, frames used in place thereof, and openings 44 also can vary in section and form.

In the clutch 60 of FIGS. 5 to 7, components corresponding to those of FIGS. 1 to 4 are identified by the same reference numeral. However, in this instance, disc 20 extends radially inwardly from annular housing 62 comprising radial annular flange 64 integral with shaft 12 and axial flange 66. Disc 20 is secured by bolts 68 to flange 66. However, in a variant of this embodiment, disc 20 can be secured to flange 66 by a splined coupling around its periphery.

In FIG. 5, housing 26 is in part enclosed by housing 62. Housing 26 includes, in addition to plate 28 which is of circular form when viewed axially, an annular ring 70 and a parallel pair of axially extending ribs 72. As shown, tube 38 is secured to plate 28 by bolts 74 which also extend into ring 70 to retain the components of housing 26 in assembly. Ribs 72 may be formed on or welded to ring 70 but, if ribs 72 are separate, bolts 74 can extend into them, as shown.

Ribs 72 are provided by a pair of plates in opposed substantially parallel relation. The plates are spaced apart a distance greater than the diameter of drive shaft 12, with the latter extending therebetween. Adjacent ends of ribs are interconnected by short connectors 76 secured thereto by bolts or by welding.

Ring 70 has an outer diameter less than that of plate 28, with pads 52 being spaced beyond the periphery of ring 70. Ribs 72 are provided with cut-outs 78 in which one pad 52 is mounted, such as by at least one pin on ribs 72 and/or on the respective connector 76 locating in an aperture of backing plate 80 of that pad.

Tube 38 is continued beyond flange 40 by a narrower extension 82. Also, between slots 44 and flange 40, tube 38 defines a cylinder in which a piston 84 is provided. Extension 82 is internally threaded at 86 to enable it to receive a rotating union, such as a Deublin union, by which it can be connected to a source of high pressure hydraulic fluid.

Operation of the clutch of FIG. 5 will be understood from a consideration of the description of FIGS. 1 to 4. However, in this instance axial movement of arms 48, to cause pads 52 to grip disc 20 for rotation of shafts 12,14 in unison, is effected by the supply of hydraulic fluid to bore 42 to urge piston 84 against bar 50. Disengagement of the resultant driving connection between shafts 12,14 is effected by releasing the hydraulic pressure supplied to bore 42.

Figure 8:
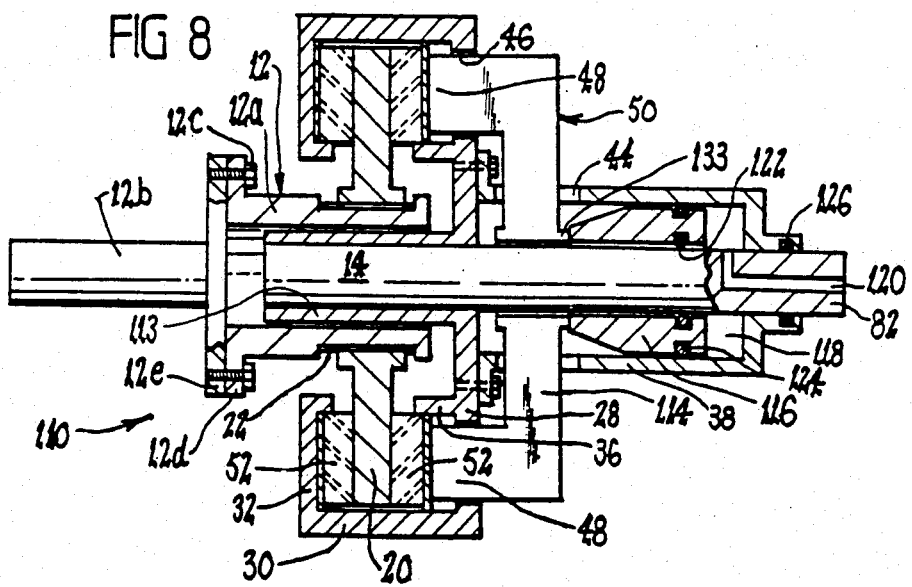
FIG. 8 is an axial sectional view of a third embodiment of a clutch according to the invention.

The clutches 10 and 60 of FIGS. 1 to 4, and 5 to 7 are suited to arrangements in which shafts 14 are not through-shafts FIG. 8 shows an embodiment suited to an arrangement in which shaft 14 is a through-shaft. In clutch 110 of FIG. 8, shaft 14 terminates within clutch 110; while shaft 12 comprises a shortened shaft member 12a and a shaft member 12b in line with shaft 14. Each of shaft members 12a and 12b abut and are interconnected by bolts 12c through respective end flanges 12d and 12e. Cluth 110 has a modified form of connection between shaft 14 and plate 28, the latter having a cylindrical hub 113 through which shaft 14 extends. Bar 50 also has a pair of oppositely extending radial arms 114. Each arm 48 is integral with the outer end of a respective arm 114, while the latter project through respective openings 44 in tube 38.

Also, tube 38 has an extension 82 through which shaft 14 extends. Within tube 38, there is an annular piston 116 slidable along shaft 14 to engage hub 113. Hydraulic or pneumatic fluid is receivable in pressure chamber 118 from a source of pressurized supply of such fluid communicating with chamber 116 via bore 120 formed in shaft 14. Respective fluid seals 122,124 are provided to seal between shaft 14 and piston 116, and between the latter and the cylinder bore defined by the interior of sleeve 38. A further such fluid seal 126 is provided between bore 42 and shaft 14.

FIG. 9 shows a further clutch 130 suited for a through shaft 14. This is similar overall to clutch 10 of FIG. 1, as modified in FIG. 8. However, tube 38 has been omitted, with an alternative form of hydraulic or pneumatic device 132 being adopted. As shown, device 132 has an annular cylinder 134 through which shaft 14 extends, and an annular piston 136. Device 132 is located between hub 113 and a flange 138 secured to shaft 14 by bolts or welding. Device 132 is axially extendable by supplying pressurized fluid from a source thereof to pressure chamber 140, via port 142 in cylinder 134. On extension of device 132, force is applied to hub 113 of bar 50 via thrust bearing 144 located between hub 113 and cylinder 134. Such force acts solely to move bar 50 to cause pads 52 to grip disc 20, due to a reaction force generated by flange 138.

Device 132 can, if required, be mounted in the reverse manner to that illustrated. Due to thrust bearing 144, and a further thrust bearing 146 between piston 136 and flange 138, fluid seals 148 are provided at the inner and outer circumference of piston 136 to seal against the adjacent wall of cylinder 134.

Clutch 150 of FIG. 10 is a variant of that shown in FIG. 9, and also is able to accommodate shaft 14 as a through-shaft. Clutch 150 differs from clutch 130 in that plate 28 carries at its outer periphery a respective, axially extending arm 152 adjacent each arm 48, with a radially inwardly extending toggle arm 154 being pivotally mounted on each arm at 156. The inner end of each arm 154 terminates adjacent shaft 14, between hub 113 and thrust bearing 144.

Operation of device 132, by supply of pressurized fluid to chamber 140, urges the inner ends 157 of arms toward hub 113, causing the required movement of arms 48 to cause pads 52 to grip disc 20 by nose portion 158 of each arm 154 to be forcefully urged against bar 50.

Figure 11:
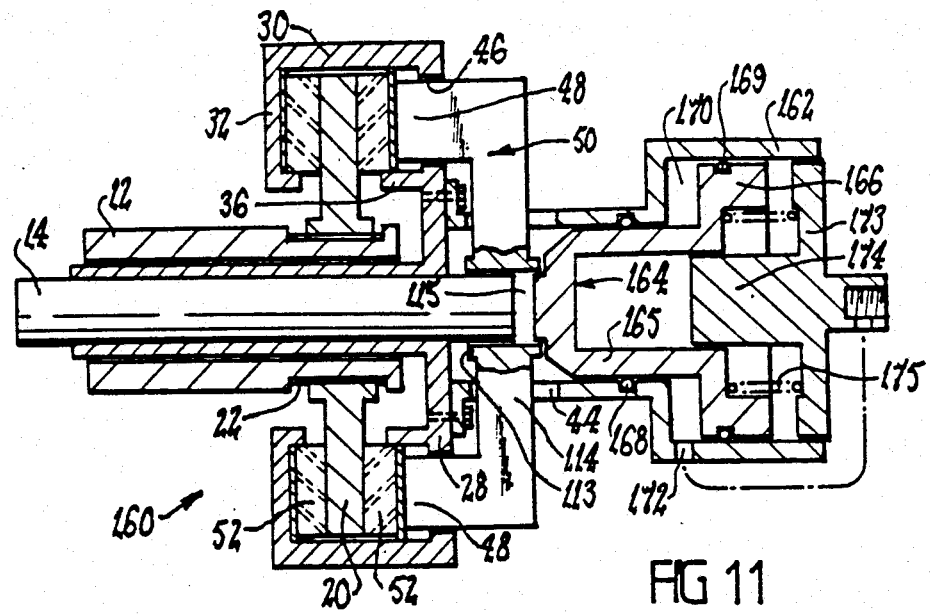
FIG. 11 is an axial sectional view of a sixth embodiment.

FIG. 11 shows a further clutch 160 suited for use with a partial through-shaft 14 which terminates in hub 113 of arm 50. Clutch 160 overall is similar to clutch 110 of FIG. 8. However, in this instance, tube 38 has an end section 162, remote from arm 50, which is of greater diameter. Tube 38 houses a piston 164 which has smaller and larger diameter sections 165, 166, with section 166 in section 162 of tube 38. Fluid seals 168,169 seal between the respective smaller and larger diameter sections of tube 38 and cylinder 164, to each side of pressure chamber 170 to which pressurized fluid is receivable from a source via port 172.

Section 162 of tube 38 is closed by an end screw cap 173 which has a hub 174 extending into the smaller diameter section 165 of piston 164. A helical spring 175 acts between cap 173 and piston 164 and urges the latter into engagement with hub 113 of arm 50. Clutch 160 is normally engaged, with arms 48 causing pads 52 to grip disc 20 under the action of spring 175; causing shafts 12,14 to rotate in unison. Clutch 160 thus differs from normally disengaged clutches 10, 60, 110, 130 and 150 described above Supply of pressurized fluid to chamber 170, via port 172, acts to force piston 164 away from arm 50 against the bias of spring 175, thereby enabling shaft 12 to rotate relative to shaft 14.

On the end of cap 173, there is provided an axially projecting fitting 176 screwed into the cap. Fitting 176 itself has an internally threaded bore 177 to enable it to receive a rotatable fitting, such as a Deublin union, for receiving pressurized fluid from a source thereof. Radially of bore 177, fitting has a port 178 by which pressurized fluid received thereat can pass to port 172 of tube section 162, via a connected conduit depicted by broken-line 179.

Figure 12:
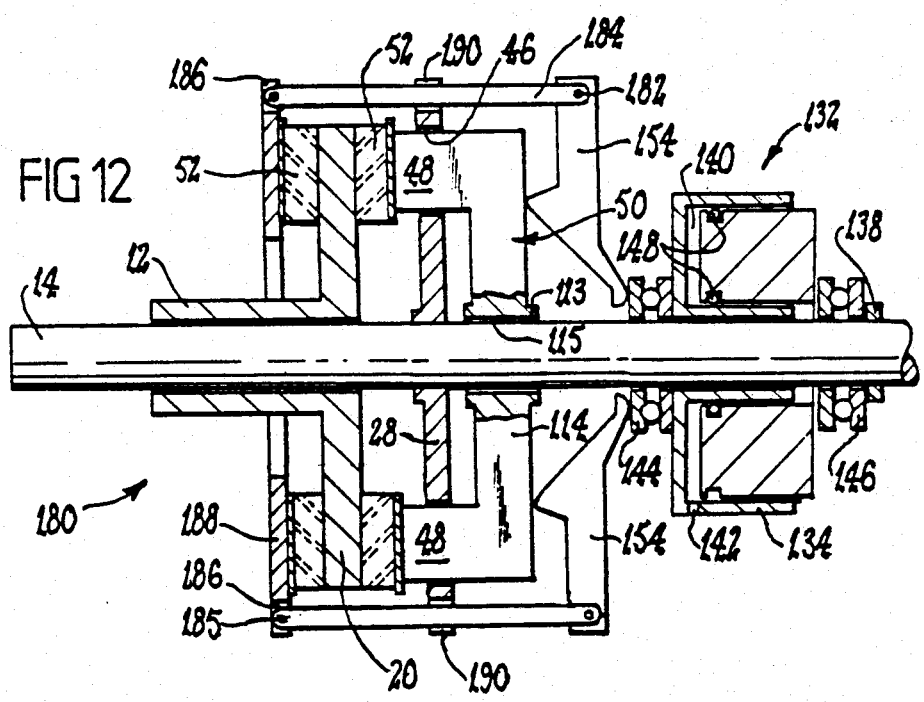
FIG. 12 shows an axial section of a seventh embodiment of a clutch according to the invention.

FIG. 12 shows a clutch 180 similar in overall form to clutch 130 of FIG. 10.

Bar 50 is movable under the action of device 132; the latter being essentially as described in FIG. 9 and therefore not further described. However, in this instance, each toggle arm 154 is pivotally connected at 182 to one end of a connecting rod 184. The other end of each rod 184 is pivotally connected at 185 to a respective tab 186 projecting radially outwardly from an annular disc or backing means 188 which is concentric with respect to shafts 12, 14. Plate 28 has a stub sleeve by which it is connected to through-shaft 14 by a taper lock, key or spline. Outwardly of its openings 46, plate 28 is provided with respective guideways 190 for each rod 184.

One pad 52 of each pair thereof is mounted on disc 188, while the other pad of each pair is mounted on the end face of a respective arm 48.

Operation of clutch 180 is substantially as described in relation to clutch 150; with device 132 being able to be fixed against rotation with shaft 14 when the clutch is engaged. However, in addition to pads 52 being caused to grip disc 20 by the action of toggle arms 154 on arm 50, pivoting of toggle arms 154 draws rods 184 and disc 188 toward disc 20. This drawing action obviates any need for a spline coupling between disc 20 and shaft 12, and also results in clutch 180 being better able to accommodate wear of pads 52.

Substantial variation is possible in each of the above described embodiments. Thus, in some instances, an actuating device of one embodiment can be used in other embodiments, subject principally to the respective shafts 14 both being through-shafts or not through-shafts, as the case may be. Also, the two part shaft 12 of FIG. 12 can readily be adopted in the preceding embodiments.

Also it will be appreciated that, where necessary, one or other of the shafts can be provided with a suitable braking arrangement to retard its rotation on disengaging the clutch. Such braking arrangement can be of any of several known forms.

I claim:

1. A clutch arrangement for co-axial shaft members including a drive or input shaft member and a driven or output shaft member; the arrangement having a disc concentrically mountable on one of the shaft members for rotation with the one shaft member; a plate member mountable on the other shaft member for rotation therewith and so as to extend at least diametrically of the other shaft member in substantially parallel relation with the disc, the plate member having at least two openings therethrough each axially in line with the disc; a respective axially extending, force applying arm located in each said opening of the plate member and each having an end thereof projecting from its opening beyond a face of the plate member remote from the disc; a frame member located adjacent said remote face of the plate member and having integrally inter-connected radially extending arms, each arm of the frame member being integral with a said end of a respective force applying arm such that the frame member rigidly interconnects each of the force applying arms; and a plurality of pairs of friction pads angularly spaced circumferentially of the disc, the pads of each pair being operatively mounted adjacent respective faces of the disc and axially in line with a respective said force applying arm such that on application of an axial force to the frame member, each axially extending force applying arm is movable with the frame member in the direction of said force to directly engage one pad of its pair and to cause the other pad of its pair to react against an associated backing means so that the pads of each pair move relative to the disc from one to the other of two relative positions, in a first of which positions the pads of each pair grip the disc, and in the second of which positions the pad releases the disc; the disc being rotatable with each of the plate member, the force applying arms and the frame member with the pads in their first position, and rotatable relative to each of the plate member, the force applying arms and the frame member with the pads in their second position.

2. A clutch arrangement according to claim 1, including as a sub-assembly of said arrangement an actuator device for applying said axial force to said frame member.

3. A clutch arrangement according to claim 2, wherein said actuator device comprises a screw device, such as a recirculating ball screw, operable to advance an actuating rod to engage and apply said axial force to said frame member.

4. A clutch arrangement according to claim 2, wherein said actuator device comprises a ram device extendable on supply of pressurized fluid thereto to engage and apply said axial force to said frame member.

5. A clutch arrangement according to claim 1, wherein one of the shaft members is a tubular outer shaft member with the other shaft member being an inner shaft member positioned within the outer shaft member, the disc being of annular form and concentrically mounted on the outer shaft member, and the frame member being mounted on the inner shaft member adjacent an end of the outer shaft member.

6. A clutch arrangement according to claim 5, wherein said inner shaft member does not extend fully through the outer shaft member but extends beyond an end of the latter which is nearer the clutch; the outer shaft member being coupled to a third shaft member extending beyond its other end.

7. A clutch arrangement according to claim 5, wherein the disc is made integral with the outer shaft member at its inner circumference or, by means of an annular housing integral with the outer shaft member, at its outer circumference.

8. A clutch arrangement according to claim 5, wherein the disc is mounted on the outer shaft member by means of a spline coupling between its inner circumference and said shaft member, or by means of a spline coupling between its outer circumference and a housing integral with the second shaft member.

9. A clutch arrangement according to claim 5, wherein the plate member has two said openings in diametrically opposed relation, the force applying arm in each of said openings being interconnected by a bar member comprising said frame member and extending between said force applying arms.

10. A clutch arrangement according to claim 9, wherein said frame member has a central hub through which said inner shaft member extends beyond said outer shaft member.

11. A clutch arrangement according to claim 5, wherein the plate member has at least three said openings substantially uniformly angularly spaced with respect to said shaft members, the arms in said openings being interconnected by respective radial bar members comprising said frame member and joined centrally with respect to said shaft members.

12. A clutch arrangement according to claim 11, wherein said plate member, at the side thereof remote from the disc has a tubular member extending axially therefrom, each said radial bar member of sad frame member extending through a respective radial opening defined by the tubular member, said radial openings enabling movement of the frame member axially with respect to said shafts on application of a said axial force to said frame member.

13. A clutch arrangement according to claim 5, wherein said plate member, at a side thereof remote from the disc, has a tubular member extending axially therefrom.

14. A clutch arrangement according to any one of claims 13, including as a sub-assembly of said arrangement an actuator device for applying said axial force to said frame member, said device comprising a screw device, such as a recirculating ball screw, operable to advance an actuating rod to engage and apply an axial force to said frame member, said actuating rod being guided by said tubular member, a thrust bearing being provided between said frame member and actuating rod to enable the actuating device to be fixed against rotation.

15. A clutch arrangement according to claim 13, including as a sub-assembly of said arrangement an actuator device, said tubular member defining a cylinder of said device and having a piston therein, said piston being resiliently biased by spring means to engage and apply said axial force to said frame member, said piston being movable on supply of pressurized fluid to said device against said bias to overcome said axial force.

16. A clutch arrangement for co-axial shaft members including a drive or input shaft member and a driven or output shaft member, one of the shaft members being a tubular outer shaft the other shaft member being an inner shaft member positioned within the outer shaft member; the arrangement having an annular disc concentrically mounted on the outer shaft member for rotation therewith; a plate member mounted on the inner shaft member for rotation therewith and so as to extend at least diametrically of the inner shaft member in substantially parallel relation with the disc, the plate member having two openings therethrough in diametrically opposed relation and each axially in line with the disc; a respective axially extending, force applying arm located in each said opening of the plate member and each having an end thereof projecting from its opening beyond a face of the plate member remote from the disc; a frame member mounted on the inner shaft member adjacent an end of the outer shaft member, the frame member comprising a bar member located adjacent said remote face of the plate member and having radially extending arm positions, each arm portion of the bar member being integral with a said end of a respective force applying arm such that the bar member interconnects each of the force applying arms; and a plurality of pairs of friction pads angularly spaced circumferentially of the disc, the pads of each pair being operatively mounted adjacent respective faces of the disc and axially in line with a respective said force applying arm such that on application of an axial force to the frame member, each axially extending force applying arm is movable to directly engage one pad of its pair and to cause the other pad of its pair to react against an associated backing means so that the pads of each pair move relative to the disc from one to the other of two relative positions, in a first of which positions the pads of each pair grip the disc, and in the second of which positions the pads release the disc; the disc being rotatable with each of the plate members, the force applying arms and the frame member with the pads in their first position, and rotatable relative to each of the plate members, the force applying arms and the frame member with the pads in their second position; said plate member, at a side thereof remote from the disc, having a tubular member extending axially therefrom; the arrangement including as a sub-assembly thereof an actuator device having a cylinder defined by said tubular member and having a piston in said cylinder movable on supply of pressurized fluid to said device to engage and apply said axial force to said frame member.

17. A clutch arrangement according to claim 16 wherein said piston is of annular form and said inner shaft is a through-shaft extending through said piston.

18. A clutch arrangement according to claim 16, wherein said inner shaft is a through-shaft, said actuator device comprising an annular cylinder and piston actuator received on said inner shaft between said frame member and abutment means on said shaft, said actuator device being extendable on supply of pressurized fluid thereto to engage and apply a said axial force to said frame member.

19. A clutch arrangement according to claim 18, wherein radially extending toggle arms are provided between said actuator device and said frame member, said toggle arms being pivotable to apply said force to the frame member.

20. A clutch arrangement according to claim 18 wherein a thrust bearing is provided at each end of said actuator device to enable the latter to be fixed against rotation.

21. A clutch arrangement for co-axial shaft members including a drive or input shaft member and a driven or output shaft member, one of the shaft members being a tubular outer shaft and the other shaft member being an inner shaft member positioned within the outer shaft member; the arrangement having an annular disc concentrically mounted on the outer shaft member for rotation therewith; a plate member mounted on the inner shaft member for rotation therewith and so as to extend at least diametrically of the inner shaft member in substantially parallel relation with the disc, the plate member having two openings therethrough in diametrically opposed relation and each axially in line with the disc; a respective axially extending force applying arm located in each said opening of the plate member and each having an end thereof projecting from its opening beyond a face of the plate member remote from the disc; a frame member mounted on the inner shaft member adjacent an end of the outer shaft member, the frame member comprising a bar member located adjacent said remote face of the plate member and having radially extending arm portions, each arm portion of the bar member being integral with a said end of a respective force applying arm such that the bar member interconnects each of the force applying arms; and a plurality of pairs of friction pads angularly spaced circumferentially of the disc, the pads of each pair being operatively mounted adjacent respective faces of the disc and axially in line with a respective said force applying arm such that on application of an axial force to the frame member, each axially extending force applying arm is movable to directly engage one pad of its pair and to cause the other pad of its pair to react against an associated backing means so that the pads of each pair move relative to the disc from one to the other of two relative positions, in a first of which positions the pads of each pair grip the disc, and in the second of which positions the pads release the disc; the disc being rotatable with each of the plate members, the force applying arms and the frame member with the pads in their first position, and rotatable relative to each of the plate members, the force applying arms and the frame member with the pads in their second position; said plate member, at the side thereof remote from the disc, having a tubular member extending axially therefrom, said bar member comprising frame member having its arm portions extending through opposed radial openings defined by the tubular member, said radial openings enabling movement of the bar member axially with respect to said shafts on application of said axial force to said frame member.

* * * * *